C. J. MINGES.
POULTRY FEEDER.
APPLICATION FILED SEPT. 30, 1918.
1,301,587.
Patented Apr. 22, 1919.
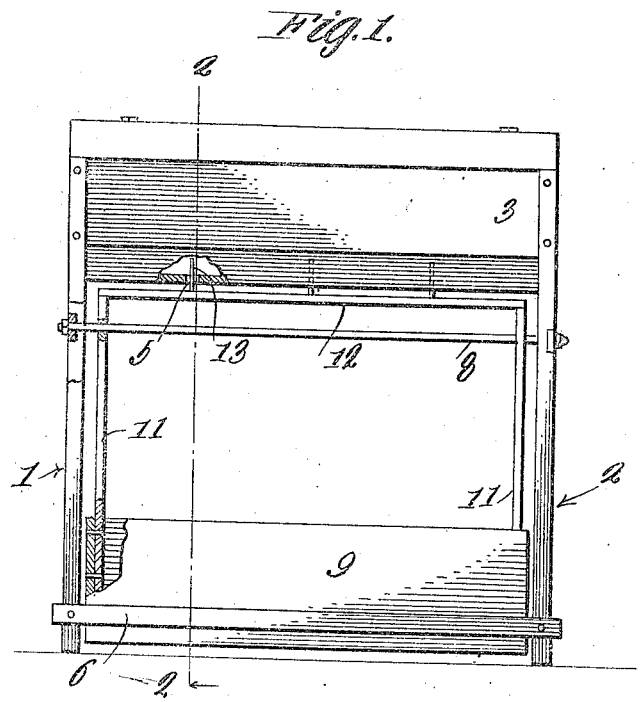
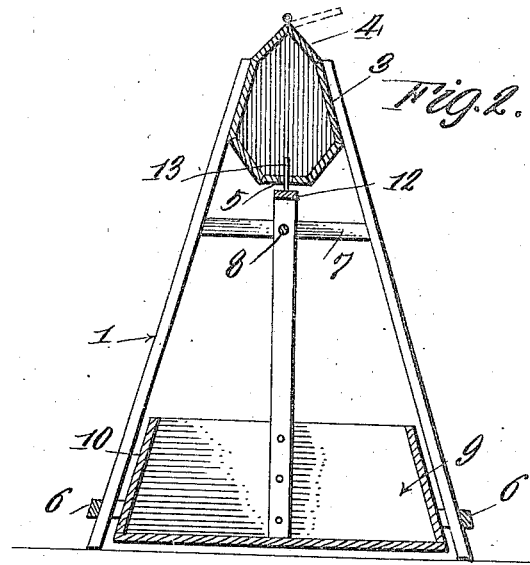
Witnesses
Guy M. Spring
S. M. McColl
Inventor
Clarence J. Minges
By Richard B. Owen
Attorney

UNITED STATES PATENT OFFICE.

CLARENCE J. MINGES, OF ROCHESTER, NEW YORK.

POULTRY-FEEDER.

1,301,587.  Specification of Letters Patent.  Patented Apr. 22, 1919.

Application filed September 30, 1918. Serial No. 256,268.

*To all whom it may concern:*

Be it known that I, CLARENCE J. MINGES, a citizen of the United States, residing at Rochester, in the county of Monroe and State of New York, have invented certain new and useful Improvements in Poultry-Feeders, of which the following is a specification.

This invention relates to poultry feeders, and the object thereof is to provide a combined feeder and exerciser constructed so that the exercise of the poultry determines the quantity of feed supplied to them.

Another object is to provide a simply constructed cheap device of this character made to withstand wear and to prevent getting out of order.

With the foregoing and other objects in view, which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings:—

Figure 1 represents a side elevation partly in section of a feeder constructed in accordance with this invention, and Fig. 2 is a transverse vertical section taken on the line 2—2 of Fig. 1.

In the embodiment illustrated, a supporting structure is shown in the form of two A-shaped end members 1 and 2, connected by a feed container and distributer 3. This container 3 is mounted at the apices of the A-shaped end supports and is polygonal in cross section as shown in Fig. 2, being provided with a door 4 for supplying food to the container, said door being shown closed in full lines in Fig. 2 and open in dotted lines. This container has in its bottom a plurality of longitudinally spaced feed discharge apertures 5, any desired number of which may be employed, three being here shown arranged in longitudinal alinement and spaced suitable distances apart.

The A-shaped end members are connected at their lower ends by bars 6, and their cross bars 7 are apertured for the passage therethrough of a suspension rod 8 which is secured in position by any suitable means, nuts being preferably used for this purpose.

A scratching box 9 is suspended between the end members 1 and 2 on the rod 8, and is designed to swing laterally a slight distance, the swinging motion being controlled by the side bars 6. This box 9 has upstanding sides 10 inclined inwardly and upwardly as shown clearly in Fig. 2 to prevent the poultry from scratching out the contents. The ends of this box are provided with upstanding bars or uprights 11 connected at their upper ends by a bar 12 and apertured for the passage therethrough of the suspension rod 8, said apertures being positioned so that the box 9 will clear the floor or other support on which the frame rests, so as to permit said box to swing freely.

A plurality of pins 13 project upwardly from the bar 12 and are positioned to enter the apertures 5 in the bottom of the container 3, being designed to prevent clogging of said apertures. The bar 12 when the device is in normal position is disposed directly below the apertures 5 of the container so that feed discharged through said apertures will fall on said bar and remain there until shaken off by the swinging movement of box 9.

In the use of this apparatus, the container 3 is first filled with any suitable feed such as small grain, bran or the like, and the door 4 closed to prevent water or the entrance of dust. Straw or other scratching material is then placed in the box 9 to attract the poultry which climb into said box and scratching in the chaff or straw cause it to swing rapidly, thereby dislodging the grain contained on bar 12 which drops into box 9 and is eaten by the poultry. It will thus be seen that the scratching of the poultry in the chaff box 9 will swing said box and supply feed to them so that in order to obtain feed they must work for it, and this work provides sufficient exercise to keep them in good condition and prevent them from becoming overfat. It is of course well known to poultrymen that overfat fowls will not lay and it is to overcome this objectionable feature that this feeder is designed.

From the foregoing description, taken in connection with the accompanying drawings, the advantages of the construction and of the method of operation will be readily apparent to those skilled in the art to which the invention appertains and while I have described the principle of operation of the invention together with the device which I now consider to be the best embodiment thereof, I desire to have it understood that the device shown is merely illustrative and that such changes may be made as are within the scope of the claimed invention.

Having thus fully described my invention, what I claim as new and desire to secure by Letters Patent, is:—

1. A device of the class described comprising a food container, a scratching box suspended to swing below said container, and coöperating means on said container and box operable on the swinging of the box to discharge feed from the container into the box.

2. In a poultry feeder, a food container having apertures in its bottom, a scratching box suspended to swing below said container, a swinging food receiver carried by said box and positioned to receive the discharge from said apertures, said receiver being positioned above said box and adapted to retain the food until dislodged by the swinging of the box, and to discharge it into the box.

3. In a poultry feeder, a supporting structure, a food container mounted therein with discharge apertures in its bottom, a scratching box suspended in said structure to swing below said container, uprights rising from said box, a cross bar connecting said uprights and positioned below the apertures in said container to receive feed from said container, and to discharge it into said box and projections extending from said cross bar into said apertures.

4. In a poultry feeder, a supporting structure comprising A-shaped end members, side bars connecting said members, a suspension rod extending through the cross bar of said members, a food container mounted in the apices of said members and connecting their upper ends, said container having apertures in its bottom, a scratching box suspended to swing from said rod, and food receiving means carried by and swinging with said box in a plane above said rod and positioned below the apertures in said container and into which the feed falls on the swinging of the box.

In testimony whereof I affix my signature in presence of two witnesses.

CLARENCE J. MINGES.

Witnesses:
MILTON PETER MINGES,
JOSEPH C. WITZEL.

Copies of this patent may be obtained for five cents each, by addressing the "Commissioner of Patents, Washington, D. C."